Dec. 20, 1960   N. H. PARKER ET AL   2,965,364
STIRRING APPARATUS
Filed Sept. 2, 1958   2 Sheets-Sheet 1

INVENTORS
Norman H. Parker
Homer K. Mountjoy
BY
Brangley, Baird, Clayton,
Miller & Vogel, Attys Dec. 20, 1960

N. H. PARKER ET AL 2,965,364

STIRRING APPARATUS

Filed Sept. 2, 1958

INVENTORS
Norman H. Parker
Homer K. Mountjoy

BY Prangley, Baird Clayton, Miller & Vogel,

Attys.

United States Patent Office 2,965,364
Patented Dec. 20, 1960

2,965,364

STIRRING APPARATUS

Norman H. Parker, Chicago, Ill., and Homer Mountjoy, Demarest, N.J., assignors to General American Transportation Corporation, Chicago, Ill., a corporation of New York Filed Sept. 2, 1958, Ser. No. 758,454

10 Claims. (Cl. 259—95)

The present invention relates to stirring apparatus, and more particularly to such apparatus especially designed for use in stirring liquid ladings contained in the tank bodies of railway tank cars.

It is a general object of the invention to provide a portable stirring unit that may be readily inserted and removed through the hatch opening formed in the top wall of the upstanding dome of a tank body of a conventional railway tank car.

Another object of the invention is to provide stirring apparatus that includes a stirring unit submerged in the liquid stored in a tank and suspended from the inner end of a rod projecting through an opening provided in a wall of the tank, wherein the rod is movably mounted upon the tank wall in the opening therein so as to accommodate positioning of the stirring unit at different desired submerged locations in the liquid.

A further object of the invention is to provide a liquid stirring unit including an electric drive motor enclosed and sealed in a casing therefor and embodying an improved and simplified arrangement for insuring complete sealing of the electric drive motor with respect to the liquid so as positively to prevent the escape of lubricant from the interior of the drive motor into the liquid or the seepage of the liquid into the interior of the drive motor, while accommodating cooling of the drive motor by the liquid.

Further features of the invention pertain to the particular arrangement of the element of the stirring unit, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
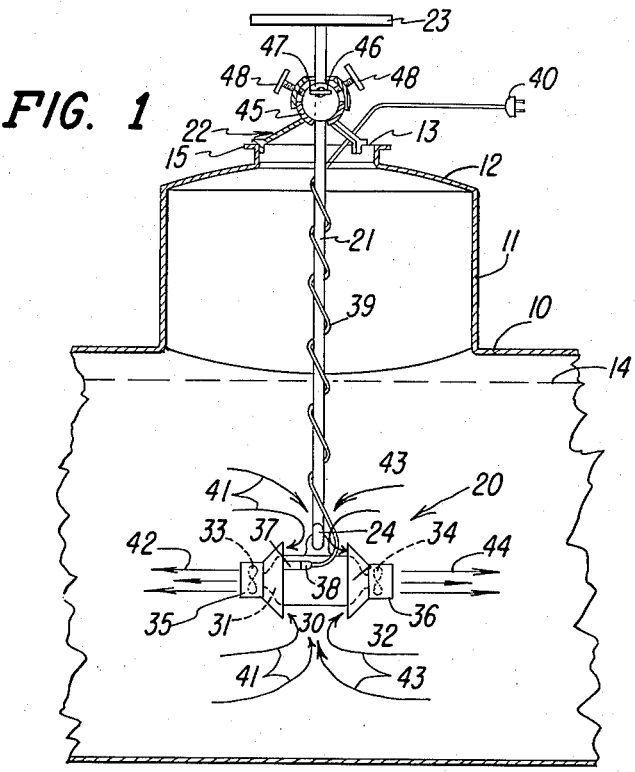
Figure 1 is a fragmentary longitudinal vertical sectional view of the tank body of a railway tank car incorporating stirring apparatus and embodying the present invention.

Referring now to Fig. 1 of the drawings, the central portion of the tank body 10 of a conventional railway tank car is illustrated that includes the usual upstanding dome 11 provided with a top wall 12 having a hatch opening 13 formed therein; which tank body 10 may contain a liquid lading, the level of which is indicated by the broken line 14. The hatch opening 13 is defined by an upstanding substantially annular hatch frame 15 that is adapted to receive an associated hatch cover, not shown. Further, it may be assumed that the liquid lading is of the type that requires stirring in order to facilitate handling thereof, particularly unloading thereof from the tank body 10. For example, many liquid ladings carry suspended solids that settle-out in the bottom of the tank body 10, whereby the liquid lading must be stirred preceding unloading thereof in order to insure suspension of the solids and the removal thereof from the tank body 10. Other liquid ladings comprise two or more liquid components that stratify in the tank body 10, whereby these liquid components should be thoroughly mixed before unloading of these liquid ladings.

Further, the tank body 10 incorporates stirring apparatus embodying the features of the present invention and comprising a stirring unit 20 carried upon the lower end of an elongated rod 21 that is carried by bracket structure 22 that is removably supported in the hatch opening 13 upon the hatch flange 15, the outer end of the rod 21 carrying a handle 23 to facilitate manipulation thereof within the hatch opening 13. The stirring unit 20 is entirely portable and may be readily placed and removed through the hatch opening 13, after the removal of the associated hatch cover, not shown, from the hatch flange 15; whereby the stirring apparatus, as a whole, may be transferred from one tank car to another for successive use thereof. The stirring unit 20 is normally suspended in the liquid lading contained in the tank body 10 upon a hook 24 carried upon the extreme lower end of the rod 21, and essentially comprises a sealed casing defined by a substantially cylindrical housing 30 and a pair of end bells 31 and 32. The casing houses an electric motor, more fully described hereinafter, that is provided with an operating shaft projecting from the opposite ends thereof through the respective end bells 31 and 32. The opposite ends of the operating shaft respectively carry a pair of impellers 33 and 34 that are respectively enclosed by a pair of shrouds 35 and 36 respectively carried by the end bells 31 and 32. The cylindrical housing 30 carries an electric connector, indicated at 37, for supplying electric power to the electric drive motor; which electric connector 37 is adapted detachably to receive another electric connector, indicated at 38; which electric connector 38 terminates the inner end of an electric cable 39 that is entwined about the rod 21 and that extends through the hatch opening 13 to the exterior. The outer end of the electric cable 39 is terminated by an electric connector, or plug 40, that is adapted to be connected to an associated source of electric power, not shown.

As explained more fully hereinafter, the two impellers 33 and 34 respectively carried by the opposite ends of the operating shaft of the electric drive motor of the stirring unit 20 are pitched in opposite directions with respect to each other and are so related with respect to the direction of rotation of the operating shaft, so that when the electric motor is operated, the two impellers 33 and 34 circulate the currents of the liquid lading in the tank body 10. More particularly, the impeller 33 draws the liquid lading into the rear end of the associated shroud 35 in general toroidal form, as indicated by the arrows 41, and then discharges the liquid from the front end of the shroud 35 in a combined stream, as indicated by the arrows 42. Similarly, the impeller 34 draws the liquid lading into the rear end of the associated shroud 36 in general toroidal form, as indicated by the arrows 43, and then discharges the liquid from the front end of the shroud 36 in a combined stream, as indicated by the arrows 44.

As previously noted, the rod 21 facilitates the placement of the stirring unit 20 in different desired submerged locations in the liquid lading; and to facilitate this manipulation of the stirring unit 20, the bracket structure 22 carries a substantially hemispherical seat 45, that supports a cooperating substantially spherical member 46 that is secured to the upper end of the rod 21, the rod 21 extending through a hole formed through the member 46. More particularly, the rod 21 is mounted for longitudinal sliding movements in the previously mentioned hole formed in the member 46; and the adjusted longitudinal position of the rod 21 may be preserved with respect to the member 46 by an arrangement including a wing screw 47 arranged in a threaded opening in the member 46 and engaging the rod 21. The substantially ball-like member 46 is mounted for substantially universal rotary movements with respect to the seat 45; and the adjusted rotary position of the ball 46 may be preserved with respect to the seat 45 by an arrangement including a pair of wing screws 48 arranged in a corresponding pair of threaded openings in the seat 45 and engaging the exterior surface of the ball 46. Of course, when the wing screws 47 and 48 are loosened, both the longitudinal and rotary positions of the rod 21 may be readily adjusted by manipulation of the handle 23, thereby to effect corresponding desired positioning of the stirring unit 20 within the tank body 10. After such positioning of the stirring unit 20, the adjustment may be preserved by tightening the wing screws 47 and 48 in an obvious manner. This arrangement permits of flexibility of the positioning of the stirring unit 20 so that the different strata or positions of the liquid lading may be thoroughly mixed prior to unloading thereof from the tank body 10.

Considering now the unloading of the liquid lading from the tank body 10 after removal of the hatch cover, not shown, one end of the stirring unit 20 is inserted through the hatch opening 13, while the stirring unit 20 is in engagement with the hook 24 provided on the extreme lower end of the rod 21. The stirring unit 20 is then lowered through the hatch opening 13 and through the dome 11 into the liquid lading by lowering the rod 21 into proper position establishing the desired suspended and submerged location of the stirring unit 20 within the tank body 10. In this position, the bracket 22 is brought into engagement with the hatch flange 15 disposed about the hatch opening 13, and the wing screws 47 and 48 are tightened to preserve the desired position of the stirring unit 20. Of course, the electric connector 40 is connected to the required source of electric power supply thereby to effect operation of the electric motor housed in the sealed casing of the stirring unit 20 and the consequent rotation of the impellers 33 and 34 with the resulting circulation of the liquid lading in the tank body 10, in the manner previously explained. The stirring apparatus may be readily removed from the tank body 10 merely by lifting upon the handle 23 so as to effect the disengagement of the bracket structure 22 from the hatch flange 15; the rod 21 is lifted further, and when the stirring unit 20 is elevated within the dome 11 just below the hatch opening 13, the operator may seize one end of the stirring unit 20 and effect rotation thereof about the hook 24 carried on the extreme lower end of the rod 21, so that the stirring unit 20 may readily pass through the hatch opening 13 to the exterior.

Figure 2:
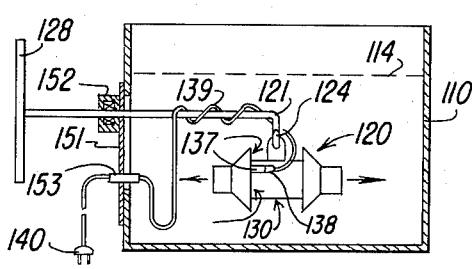
Fig. 2 is a vertical sectional view of a stationary tank incorporating a modified form of the stirring apparatus.

Referring now to Fig. 2, there is illustrated a stationary tank 110 having an open top and containing a liquid lading, requiring stirring, the level of the liquid lading being indicated by the broken line 114. Also a stirring unit 120 is arranged in the tank 110 in submerged relation with respect to the contained liquid lading, and is suspended by a hook 124 carried upon the extreme inner end of a rod 121. The rod 121 is mounted for longitudinal movements upon a plate 151 that is removably carried by a side wall of the tank 110 about an associated opening 110a formed therein; which mounting arrangement also includes a sealing gland 152 that accommodates the longitudinal sliding movements of the rod 121 and prevents leakage of the liquid lading from the tank 110. The stirring unit 120 is provided with an electric drive motor that is supplied via an electric cable 139; which electric cable in this case extends through a suitable insulating seal 153, also carried by the plate 151 and extending through the opening 110a formed in the adjacent side wall of the tank 110. The extreme outer end of the rod 121 carries the handle 123 to facilitate longitudinal sliding movements thereof for the purpose of positioning the stirring unit 120 within the liquid lading contained in the tank 110. The opposite ends of the electric cable 139 carry the electric connectors 138 and 140 that are employed for the purpose of completing the supply of electric power to the electric drive motor of the stirring unit 120.

Figure 3:
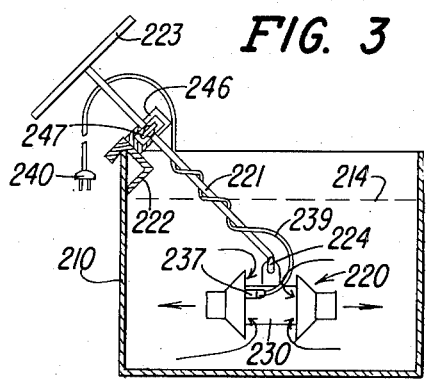
Fig. 3 is a vertical sectional view of another stationary tank incorporating another modified form of the stirring apparatus.

Referring now to Fig. 3, there is illustrated a stationary tank 210 having an open top and containing a liquid lading requiring stirring, the level of the liquid lading being indicated by the broken line 214. Also a stirring unit 220 is arranged in the tank 210 in submerged relation with respect to the contained liquid lading, and is suspended by a hook 224 carried upon the extreme inner end of a rod 221. The rod 221 is mounted for longitudinal movements upon bracket structure 222 carried by the side wall of the tank 210 adjacent to the top opening thereinto, which bracket structure 222 carries a sleeve 246 slidably mounting the rod 221 in an inclined position, and provided with a wing screw 247 for preserving the longitudinally adjusted position of the rod 221. The stirring unit 220 is of the character of that previously described and is provided with the electric cable 239 for the power supply purpose; which electric cable 239 is provided with the electric connectors 238 and 240, for the purpose previously explained; and the extreme outer end of the rod 221 is provided with the handle 223 to facilitate positioning of the stirring unit 220 in the tank 210, for the purpose previously explained.

Figure 4:
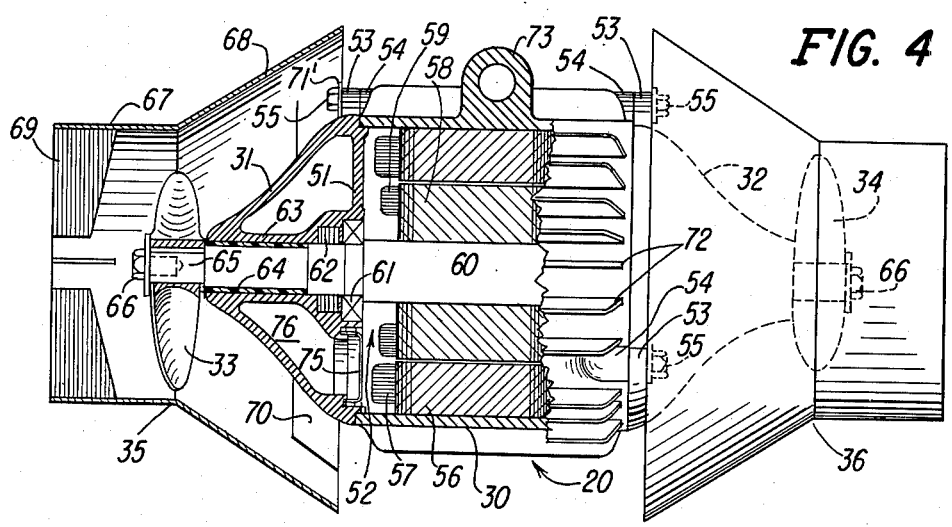
Fig. 4 is an enlarged side elevational view, partly in section, of the stirring unit incorporated in the stirring apparatus of Figs. 1, 2 and 3 and embodying the present invention.
Figure 5:
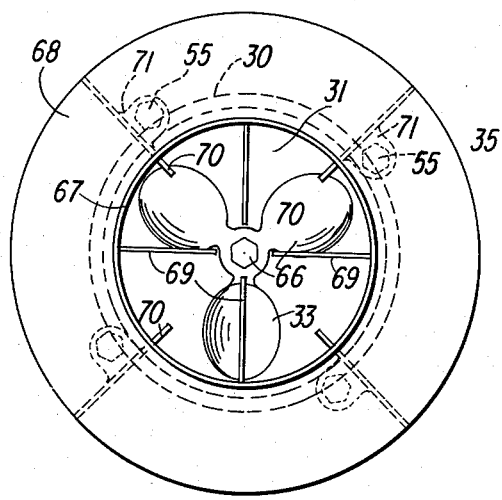
Fig. 5 is an elevational view of the left-hand end of the stirring unit shown in Fig. 4.
Figure 6:
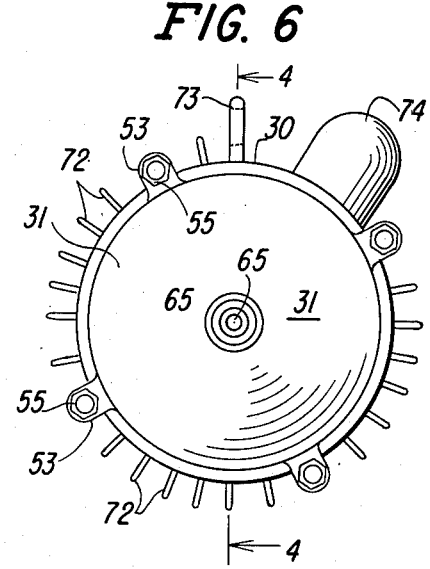
Fig. 6 is another end elevational view of the left-hand end of the stirring unit, similar to Fig. 5, with the shroud and impeller removed from the adjacent left-hand end bell thereof.

Referring now to Figs. 4, 5 and 6, the stirring unit 20 there illustrated and embodying the features of the present invention is suitable for incorporation in the stirring apparatus of Figs. 1, 2 and 3, as previously explained; which stirring unit 20 comprises the substantially cylindrical housing 30 provided with the pair of end bells 31 and 32. As illustrated in Fig. 4, the end bells 31 and 32 respectively carry end walls 51 respectively arranged in the opposite ends of the housing 30 and cooperating therewith to define a sealed chamber 52 therein. Also the end bells 31 and 32 carry lugs 53 that cooperate with corresponding lugs 54 carried by the housing 30; and the end bells 31 and 32 are detachably secured to the opposite ends of the housing 30 by cooperating series of cap screws 55 extending through aligned openings provided in the cooperating lugs 53 and 54. Also the unit 20 comprises an electric drive motor that is arranged in the sealed chamber 52, and which includes a stator 56 provided with a winding 57 and a cooperating rotor 58 provided with a squirrel cage winding 59, the rotor 58 being mounted rigidly upon the associated operating shaft 60. The opposite ends of the operating shaft 60 are respectively supported in a pair of anti-friction bearing elements 61 respectively carried in a pair of cooperating annular openings respectively provided in the adjacent end walls 51; and further, the opposite ends of the operating shaft 60 respectively project through and into cooperating relationship with a pair of sealing elements 62 arranged in another pair of cooperating annular openings respectively provided in a pair of tubular elements 63 respectively extending between the end walls 51 and the adjacent end bells 31 and 32. The sealing elements 62 are disposed outwardly of the adjacent anti-friction bearing elements 61 and are preferably of the "Gits" type, so as to seal the adjacent surrounded portions of the operating shaft 60 and the corresponding ends of the chamber 52 against the passage of liquid along the operating shaft 60 either into or out of the sealed chamber 52; and further, the sealed chamber 52 contains a charge of light mineral oil submerging the stator 56 and the rotor 58, as well as the windings 57 and 59 respectively carried thereby. Further, the opposite ends of the operating shaft 60 project through a pair of cooperating tubular sleeves 64 respectively arranged in a pair of cooperating cylindrical bores respectively provided in the tubular elements 63; and ultimately, the opposite ends of the operating shaft 60 project through the outer ends of the end bells 31 and 32 and respectively terminate in a pair of shanks 65 respectively carrying the previously described impellers 33 and 34 respectively disposed adjacent to the end bells 31 and 32. In the arrangement, the sleeves 64 are formed of a suitable heat-resistant and oil-resistant synthetic organic material, such as polytetrafluoroethylene, sold as "Teflon"; the sleeves 64 retard the passage of the liquid lading along the operating shaft 64 into contact with the "Gits" seals 62; and the seals 62 prevent the passage of the liquid lading into the sealed chamber 52.

Further, the impellers 33 and 34 are detachably secured in place upon the extreme outer ends of the shanks 65 by cooperating cap screws 66. The impellers 33 and 34 are respectively surrounded by the shrouds 35 and 36 that are of identical construction. As illustrated, the shroud 35 is of substantially bell-shape, including an outer cylindrical section 67 and an inner frusto-conical section 68. The outer section 67 is disposed outwardly of the adjacent impeller 33, and carries a number of angularly spaced-apart vanes 69 in the outer end thereof, so as to minimize the swirl of the liquid lading as it is discharged from the section 67. Similarly, the inner section 68 is disposed inwardly of the adjacent impeller 33 and in surrounding relation with the adjacent end bell 31, and carries a number of angularly spaced-apart vanes 70 in the inner end thereof, so as to minimize the swirl of the liquid lading as it is drawn into the section 68. Also, the vanes 70 carry tabs 71 that cooperate with the adjacent ones of the cap screws 55, so as detachably to secure the shroud 35 in place, with the end bell 31, to the adjacent end of the housing 30; and in the arrangement, the sets of vanes 69 and 70 are preferably angularly displaced, as best shown in Fig. 5.

The charge of light mineral oil contained in the sealed chamber 52 absorbs heat that is developed in the windings 57 and 59 and conducts this heat to the housing 30; and likewise, the laminations of the stator 56 conduct heat to the housing 30. In order to effect the conduction of this heat from the housing 30 to the associated liquid lading a number of angularly spaced-apart fins 72 are carried upon the outer surface of the housing 30 and project outwardly therefrom, as best illustrated in Fig. 6. Also the housing 30 carries a hook-receiving loop 73 at the top thereof for the suspension purpose previously described; and also, the housing 30 carries a fixture 74 in which the electric connector 37 is sealed in place so as to prevent the passage of liquid in either direction along the connector 37 and through the fixture 74. Of course, the electric connector 37 sealed in the fixture 74 terminates the winding 57, and is adapted to receive the electric connector 38 provided on the adjacent end of the electric cable 39, as previously described; and further, the fixture 74 is arranged to provide a seal to the electric connector 38, so as to prevent the entry of the liquid lading into the electrical connection between the two electric connectors 37 and 38. In the electric motor, the winding 57 provided on the stator 56 may be of the single-phase type or of the polyphase type; whereby the electric connectors 37 and 38, as well as the cable 39, and also the electric connector 40, are correspondingly constructed.

During the operation of the electric motor, the windings 57 and 59 are heated effecting heating of the light mineral oil contained in the sealed chamber 52 and the consequent transfer of the heat to the fins 72 for further transfer thereof to the submerging liquid lading as previously explained. As the temperature of the light mineral oil confined in the sealed chamber 52 is varied, the volume thereof correspondingly varies; and in order to prevent undue pressure variations of this charge of light mineral oil, a number of expansible-contractible diaphragms 75 are arranged and heremetically sealed in place in a corresponding number of angularly spaced-apart windows provided through the end walls 51. More particularly, in the end bell 31 illustrated, an air chamber 76 is defined therein and positioned outwardly of the adjacent end wall 51 and in surrounding relation with the adjacent tubular element 63; whereby the diaphragms 75 hermetically sealed in the windows provided through the left-hand end wall 51 are contracted by the light mineral oil confined in the sealed chamber 52 on one side thereof and by the air confined in the air chamber or pocket 76 formed in the adjacent end bell 31 on the other side thereof. Accordingly, as the temperature of the charge of light mineral oil rises, the volume thereof tends to expand, whereby an increased pressure is exerted upon the diaphragms 75 causing the diaphragms 75 to be moved so as to compress the air in the pocket 76 for the purpose of substantially equalizing the pressures mentioned; and of course, when the temperature of the charge of light mineral oil falls, a reverse effect takes place with respect to the diaphragms 75. Accordingly, the diaphragms 75 expand and contract due to their resiliency and in response to the pressures exerted thereupon, so as to maintain substantially equal the pressures in the sealed chamber 52 and in the pocket 76; and in this connection, it is noted that it is preferable that when the stirring unit 20 is at the ambient temperature, the sealed chamber 52 is substantially full of the charge of light mineral oil substantially at atmospheric pressure, and the pocket 76 is full of air also at atmospheric pressure.

The general mode of operation of the stirring unit 20 has previously been described, but at this point it is mentioned that the direction of rotation of the operating shaft 60 is established by the characteristic of the winding 76 of the stator 56, and the impellers 33 and 34 are oppositely pitched so that the lading is outwardly circulated from each of the impellers 33 and 34 in the manner previously described. Also, it will be understood that the vanes 70 minimize swirl of the liquid lading that is drawn into the adjacent open ends of the shroud 35, and the vanes 69 minimize swirl of the lading projected from the outer end of the shroud 35. Moreover, the arrangement of the sleeve 64 surrounding the adjacent portions of the operating shaft 60 cooperate with the associated "Gits" seals 62 surrounding the next adjacent portions of the operating shaft 60, effectively prevent the passage of the liquid lading along the operating shaft 60 into the interior of the stirring unit 20 and also effectively prevent the passage of the light mineral oil confined in the sealed chamber 52 along the operating shaft 60 to the exterior of the stirring unit 20 and into the liquid lading that is undergoing the stirring action.

In view of the foregoing, it is apparent that there has been provided stirring apparatus of improved construction and arrangement, including an improved stirring unit, that is particularly suited for use in the stirring of liquid ladings carried in the tank bodies of conventional railway tank cars.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination with a railway tank car provided with a tank body adapted to contain a liquid lading requiring stirring thereof, wherein said tank body includes an upstanding dome provided with a top wall having a hatch opening thereinto, a stirring unit readily movable through said hatch opening into and out of said tank body, and means for suspending said stirring unit from said top wall within said tank body and submerged in the liquid lading; said stirring unit including a liquid-tight tubular casing having an end bell, an electric drive motor sealed in said casing out of contact with the liquid lading and provided with a rotatably mounted operating shaft, the outer end of said operating shaft projecting to the exterior of said casing through a sealed opening provided in said end bell, an impeller carried by the outer end of said operating shaft and arranged adjacent to said end bell and disposed in contact with the liquid lading, and a shroud carried by said casing and enclosing said end bell and said impeller and cooperating therewith to define a liquid duct, said shroud being substantially tubular and forwardly tapered from an open ended rear section surrounding said end bell to an open ended front section surrounding said impeller; whereby operation of said drive motor effects rotation of said impeller and the consequent circulation of the liquid lading over the outer surface of said casing and through said liquid duct with the resulting stirring of the liquid lading in said tank body.

2. In combination with a railway tank car provided with a tank body adapted to contain a liquid lading requiring stirring thereof, wherein said tank body includes an upstanding dome provided with a top wall having a hatch opening thereinto, an elongated rod removably supported by said top wall in an upstanding position in said hatch opening, a stirring unit suspended from the lower end of said rod within said tank body and submerged in the liquid lading, and a handle carried by the upper end of said rod above said top wall and facilitating movments of said rod in said hatch opening so as to accommodate positioning of said stirring unit at different desired submerged locations in the liquid lading; said stirring unit including a liquid-tight tubular casing having an end bell, an electric drive motor sealed in said casing out of contact with the liquid lading and provided with a rotatably mounted operating shaft, the outer end of said operating shaft projecting to the exterior of said casing through a sealed opening provided in said end bell, an impeller carried by the outer end of said operating shaft and arranged adjacent to said end bell and disposed in contact with the liquid lading, and a shroud carried by said casing and enclosing said end bell and said impeller and cooperating therewith to define a liquid duct, said shroud being substantially tubular and forwardly tapered from an open ended rear section surrounding said end bell to an open ended front section surrounding said impeller, whereby operation of said drive motor effects rotation of said impeller and the consequent circulation of the liquid lading over the outer surface of said casing and through said liquid duct with the resulting stirring of the liquid lading in said tank body.

3. In combination with a tank adapted to contain a liquid lading requiring stirring thereof, wherein said tank includes a wall having an opening therethrough, an elongated rod movably supported by said tank in said opening with the inner end thereof projecting into the liquid lading, and a stirring unit suspended from the inner end of said rod and submerged in the liquid lading, said rod accommodating positioning of said stirring unit at different desired submerged locations within the liquid lading; said stirring unit including a sealed casing provided with a tubular housing and a pair of end bells disposed at the opposite ends thereof, an electric motor housed within said casing and provided with a stator and a cooperating rotor having an operating shaft projecting axially from the opposite ends of said casing through a pair of sealed openings respectively formed in said end bells, a pair of impellers respectively carried by the opposite ends of said shaft and rotatable therewith and respectively disposed adjacent to said end bells, each of said impellers being somewhat smaller in diameter than the adjacent end bell and disposed forwardly thereof, a pair of shrouds respectively carried by the opposite ends of said casing and respectively enclosing said end bells and said impellers and respectively cooperating therewith to define a pair of liquid ducts, each of said shrouds being substantially tubular and forwardly tapered from an open ended rear section surrounding the adjacent end bell to an open ended front section surrounding the adjacent impeller, said impellers being pitched in opposite directions related to the direction of rotation of said shaft so that a pair of oppositely directed currents of the liquid lading are respectively circulated through said liquid ducts incident to rotation of said shaft, each of the liquid lading currents being drawn into the open rear end of the associated shroud in generally toroidal form and proceeding through the adjacent impeller and being discharged from the open front end of the associated shroud as a combined stream, and an electric cable impervious to the liquid lading and sealed in a hole formed in said casing and extending to an exterior electric power source for supplying electric power to said motor so as to effect operation thereof.

4. A liquid stirring unit suspended in a body of liquid to be stirred, and comprising a sealed casing including a tubular housing and a pair of end bells disposed at the opposite ends thereof, an electric motor housed within said casing and including a stator and a cooperating rotor provided with an operating shaft projecting axially from the opposite ends of said casing through a pair of sealed openings respectively formed in said end bells, a pair of impellers respectively carried by the opposite ends of said shaft and rotatable therewith and respectively disposed adjacent to said end bells, each of said impellers being somewhat smaller in diameter than the adjacent end bell and disposed forwardly thereof, a pair of shrouds respectively carried by the opposite ends of said casing and respectively enclosing said end bells and said impellers and respectively cooperating therewith to define a pair of liquid ducts, each of said shrouds being substantially tubular and forwardly tapered from an open ended rear section surrounding the adjacent end bell to an open ended front section surrounding the adjacent impeller, said impellers being pitched in opposite directions related to the direction of rotation of said shaft so that a pair of oppositely directed currents of the liquid are respectively circulated through said liquid ducts incident to rotation of said shaft, each of the liquid currents being drawn into the open rear end of the associated shroud in generally toroidal form and proceeding through the adjacent impeller and being discharged from the open front end of the associated shroud as a combined stream, and an electrical connecting device sealed in a hole formed in said casing for supplying electric power to said motor so as to effect operation thereof.

5. The liquid stirring unit set forth in claim 4, and further comprising radially outwardly projecting fin structure carried by the outer surface of said housing for facilitating heat transfer from said motor to the liquid currents circulated over said casing.

6. The liquid stirring unit set forth in claim 4, and further comprising hollow structure carried by said casing in surrounding relation with said electrical connecting device and receiving another cooperating removable electrical connecting member and to effect a liquid-impervious joint between said device and said member in electrical connected relation with each other.

7. The liquid stirring unit set forth in claim 4, and further comprising a pair of vane sets respectively disposed in said liquid ducts for minimizing axial swirl of the liquid streams respectively discharged from said shrouds.

8. A liquid stirring unit suspended in a body of liquid to be stirred, and comprising a sealed casing including a tubular housing and a pair of end bells disposed at the opposite ends thereof, an electric motor housed within said casing and including a stator and a cooperating rotor provided with an operating shaft projecting axially from the opposite ends of said casing through a pair of sealed openings respectively formed in said end bells, a pair of impellers respectively carried by the opposite ends of said shaft and rotatable therewith and respectively disposed adjacent to said end bells, each of said impellers being somewhat smaller in diameter than the adjacent end bell and disposed forwardly thereof, a pair of shrouds respectively carried by the opposite ends of said casing and respectively enclosing said end bells and said impellers and respectively cooperating therewith to define a pair of liquid ducts, each of said shrouds being substantially tubular and forwardly tapered from an open ended rear section surrounding the adjacent end bell to an open ended front section surrounding the adjacent impeller, said impellers being pitched in opposite directions related to the direction of rotation of said shaft so that a pair of oppositely directed currents of the liquid are respectively circulated through said liquid ducts incident to rotation of said shaft, each of the liquid currents being drawn into the open rear end of the associated shroud in generally toroidal form and proceeding through the adjacent impeller and being discharged from the open front end of the associated shroud as a combined stream, a pair of first vane sets respectively arranged in the rear ends of said liquid ducts to minimize axial swirl of the liquid currents respectively drawn into the open rear ends of said shrouds, a pair of second vane sets respectively arranged in the front ends of said liquid ducts to minimize axial swirl of the liquid currents discharged from the open front ends of said shrouds, and an electrical connecting device sealed in a hole formed in said casing for supplying electric power to said motor so as to effect operation thereof.

9. A liquid stirring unit suspended in a body of liquid to be stirred, and comprising a sealed casing including a tubular housing and a pair of end bells disposed at the opposite ends thereof, a pair of end walls respectively disposed in the opposite ends of said housing and cooperating therewith to define a sealed chamber therein, an electric motor arranged in said chamber and including a stator and a cooperating rotor, a charge of light-weight electrical-insulating liquid contained in said chamber and immersing said stator and said rotor, an operating shaft carried by said rotor and projecting axially from the opposite ends thereof through a pair of aligned and sealed openings respectively formed in said end walls and in said end bells and thence to the exterior, a pair of impellers respectively carried by the opposite ends of said shaft and rotatable therewith and respectively disposed adjacent to said end bells, each of said impellers being somewhat smaller in diameter than the adjacent end bell and disposed forwardly thereof, a pair of shrouds respectivey carried by the opposite ends of said casing and respectively enclosing said end bells and said impellers and respectively cooperating therewith to define a pair of liquid ducts, each of said shrouds being substantially tubular and forwardly tapered from an open ended rear section surrounding the adjacent end bell to an open ended front section surrounding the adjacent impeller, said impellers being pitched in opposite directions related to the direction of rotation of said shaft so that a pair of oppositely directed currents of the liquid are respectively circulated through said liquid ducts incident to rotation of said shaft, each of the liquid currents being drawn into the open rear end of the associated shroud in generally toroidal form and proceeding through the adjacent impeller and being discharged from the open front end of the associated shroud as a combined stream, and an electrical connecting device sealed in a hole formed in said casing for supplying electric power to said motor so as to effect operation thereof.

10. A liquid stirring unit suspended in a body of liquid to be stirred, and comprising a sealed casing including a tubular housing and a pair of end bells disposed at the opposite ends thereof, a pair of end walls respectively disposed in the opposite ends of said housing and cooperating therewith to define a sealed chamber therein, an electric motor arranged in said chamber and including a stator and a cooperating rotor, a charge of light-weight electrical-insulating liquid contained in said chamber and immersing said stator and said rotor, said end walls respectively cooperating with said end bells to define a pair of sealed gas pockets respectively arranged in said end bells, a pair of windows respectively formed in said end walls, a pair of expansible-contractible diaphragms respectively sealed to said end walls and respectively covering said windows, thereby to accommodate expansion and contraction of said charge of light-weight liquid incident to heating thereof and corresponding changes in the volumes of said gas pockets incident to the movements of said diaphragms, an operating shaft carried by said rotor and projecting axially from the opposite ends thereof through a pair of aligned and sealed openings respectively formed in said end walls and in said end bells and thence to the exterior, a pair of impellers respectively carried by the opposite ends of said shaft and rotatable therewith and respectively disposed adjacent to said end bells, each of said impellers being somewhat smaller in diameter than the adjacent end bell and disposed forwardly thereof, a pair of shrouds respectively carried by the opposite ends of said casing and respectively enclosing said end bells and said impellers and respectively cooperating therewith to define a pair of liquid ducts, each of said shrouds being substantially tubular and forwardly tapered from an open ended rear section surounding the adjacent end bell to an open ended front section surrounding the adjacent impeller, said impellers being pitched in opposite directions related to the direction of rotation of said shaft so that a pair of oppositely directed currents of the liquid are respectively circulated through said liquid ducts incident to rotation of said shaft, each of the liquid currents being drawn into the open rear end of the associated shroud in generally toroidal form and proceeding through the adjacent impeller and being discharged from the open front end of the associated shroud as a combined stream, and an electrical connecting device sealed in a hole formed in said casing for supplying electric power to said motor so as to effect operation thereof.

References Cited in the file of this patent

UNITED STATES PATENTS

| | | |
|---|---|---|
| 1,315,181 | Cavanaugh et al. | Sept. 2, 1919 |
| 1,683,949 | Bergdoll | Sept. 11, 1928 |
| 1,762,950 | Beers | June 10, 1930 |
| 2,023,460 | Beach | Dec. 10, 1935 |
| 2,210,160 | Beal | Aug. 6, 1940 |
| 2,309,707 | Myers | Feb. 2, 1943 |
| 2,321,126 | Breuer | June 8, 1943 |
| 2,615,068 | Radice | Oct. 21, 1952 |
| 2,792,158 | Veitch et al. | May 14, 1957 |
| 2,862,122 | Courtin et al. | Nov. 25, 1958 |